(12) United States Patent
Ito et al.

(10) Patent No.: US 9,770,856 B2
(45) Date of Patent: Sep. 26, 2017

(54) COMPOSITE MOLDED ARTICLE HAVING TWO-LAYER STRUCTURE

(75) Inventors: Akira Ito, Yokkaichi (JP); Satoshi Nagai, Yokkaichi (JP); Hiroyuki Hamada, Kyoto (JP); YewWei Leong, Kyoto (JP)

(73) Assignees: National University Corporation Kyoto Insitute of Technology, Kyoto (JP); Mitsubishi Gas Chamical Company, Inc., Tokyo (JP)

( * ) Notice: Subject to any disclaimer, the term of this patent is extended or adjusted under 35 U.S.C. 154(b) by 599 days.

(21) Appl. No.: 12/736,940

(22) PCT Filed: May 26, 2009

(86) PCT No.: PCT/JP2009/059565
§ 371 (c)(1),
(2), (4) Date: Jun. 23, 2011

(87) PCT Pub. No.: WO2009/145165
PCT Pub. Date: Dec. 3, 2009

(65) Prior Publication Data
US 2011/0250456 A1    Oct. 13, 2011

(30) Foreign Application Priority Data

May 29, 2008    (JP) .................................. 2008-140417

(51) Int. Cl.
*B32B 7/04*       (2006.01)
*B32B 27/08*      (2006.01)
(Continued)

(52) U.S. Cl.
CPC .... *B29C 45/1657* (2013.01); *B29C 45/14311* (2013.01); *B32B 7/04* (2013.01);
(Continued)

(58) Field of Classification Search
None
See application file for complete search history.

(56) References Cited

U.S. PATENT DOCUMENTS 3,931,102 A * 1/1976 Grossmann .......... C08K 5/3492
                                                    524/100
4,277,577 A * 7/1981 Burg ....................... C08L 59/02
                                                    524/291
(Continued)

FOREIGN PATENT DOCUMENTS

JP    11-320606      *  11/1999
JP    11-320606 A       11/1999
(Continued)

OTHER PUBLICATIONS

JP 2007-160718 (Senoo et al) (published Jun. 28, 2007) (full English translation).*
(Continued)

*Primary Examiner* — Vivian Chen
(74) *Attorney, Agent, or Firm* — Foley & Lardner LLP

(57) ABSTRACT

The present invention has an object of providing a molded article of a composite structure obtained by bonding a polar thermoplastic resin, especially polyacetal, with another resin in a simple manner. According to the present invention, a molded article of a composite structure obtained by bonding a polar thermoplastic resin and a resin containing an aliphatic ester structure as a main component to each other in the state where at least a face at which both of the materials contact each other is in a melted state can be provided.

12 Claims, 1 Drawing Sheet

Hot stage

(51) Int. Cl.
| | |
|---|---|
| *B32B 27/28* | (2006.01) |
| *B32B 27/36* | (2006.01) |
| *B32B 37/04* | (2006.01) |
| *B32B 37/15* | (2006.01) |
| *B29C 45/14* | (2006.01) |
| *B29C 45/16* | (2006.01) |
| *B29C 47/02* | (2006.01) |
| *B29C 47/04* | (2006.01) |
| *B29C 47/06* | (2006.01) |
| *C08L 59/00* | (2006.01) |
| *C08L 67/02* | (2006.01) |
| *C08L 67/04* | (2006.01) |
| *C08L 69/00* | (2006.01) |
| *B32B 15/08* | (2006.01) |
| *B29K 67/00* | (2006.01) |
| *B29K 69/00* | (2006.01) |
| *B29K 669/00* | (2006.01) |
| *B29K 659/00* | (2006.01) |
| *B29C 45/00* | (2006.01) |
| *B29K 59/00* | (2006.01) |

(52) U.S. Cl.
CPC .............. *B32B 15/08* (2013.01); *B32B 27/36* (2013.01); *B29C 45/0001* (2013.01); *B29C 45/14* (2013.01); *B29C 45/14778* (2013.01); *B29C 45/16* (2013.01); *B29C 45/1671* (2013.01); *B29C 45/1679* (2013.01); *B29C 47/02* (2013.01); *B29C 47/04* (2013.01); *B29C 47/06* (2013.01); *B29C 2045/14319* (2013.01); *B29C 2045/1659* (2013.01); *B29K 2059/00* (2013.01); *B29K 2067/04* (2013.01); *B29K 2067/046* (2013.01); *B29K 2069/00* (2013.01); *B29K 2659/00* (2013.01); *B29K 2667/04* (2013.01); *B29K 2667/046* (2013.01); *B29K 2669/00* (2013.01); *B29K 2995/006* (2013.01); *B32B 27/08* (2013.01); *B32B 27/285* (2013.01); *B32B 37/04* (2013.01); *B32B 37/15* (2013.01); *B32B 2250/02* (2013.01); *B32B 2250/24* (2013.01); *B32B 2307/716* (2013.01); *B32B 2307/7163* (2013.01); *B32B 2309/02* (2013.01); *B32B 2367/00* (2013.01); *B32B 2369/00* (2013.01); *B32B 2371/00* (2013.01); *C08L 59/00* (2013.01); *C08L 67/02* (2013.01); *C08L 67/04* (2013.01); *C08L 69/00* (2013.01); *Y10T 428/31507* (2015.04); *Y10T 428/31786* (2015.04); *Y10T 428/31797* (2015.04); *Y10T 428/31928* (2015.04)

(56) References Cited

U.S. PATENT DOCUMENTS

| | | | | |
|---|---|---|---|---|
| 4,873,282 A * | 10/1989 | Yui et al. | ........................ | 524/496 |
| 4,957,677 A * | 9/1990 | Katoh et al. | ................... | 264/135 |
| 5,154,979 A * | 10/1992 | Kerschbaumer et al. | . | 428/476.9 |
| 5,216,050 A * | 6/1993 | Sinclair | ........................ | 524/108 |
| 5,346,966 A * | 9/1994 | Spinu | ................... | C08G 63/664 525/411 |
| 5,654,380 A * | 8/1997 | Kawai | ..................... | C08G 63/64 525/439 |
| 5,866,647 A * | 2/1999 | Massey et al. | ................ | 508/100 |
| 5,886,093 A * | 3/1999 | Davies et al. | ................. | 524/755 |
| 5,910,545 A * | 6/1999 | Tsai et al. | ...................... | 525/178 |
| 5,952,410 A * | 9/1999 | Yokoyama et al. | .......... | 524/210 |
| 5,977,266 A * | 11/1999 | Reil et al. | ...................... | 525/402 |
| 6,153,276 A * | 11/2000 | Oya | ........................ | B32B 27/08 383/109 |
| 6,296,797 B1 * | 10/2001 | Ziegler et al. | ................. | 264/255 |
| 6,334,615 B1 * | 1/2002 | Uchiyama et al. | ........... | 277/376 |
| 6,462,105 B1 * | 10/2002 | Kuroki | ..................... | C08J 3/226 264/210.7 |
| 6,517,949 B1 * | 2/2003 | Mutsuda | ........................ | 428/501 |
| 6,652,983 B1 * | 11/2003 | Mori | .................. | B29C 45/14811 428/480 |
| 6,803,008 B2 * | 10/2004 | Buchanan, Jr. | ............... | 264/259 |
| 6,896,951 B2 * | 5/2005 | Nelson | ........................... | 428/192 |
| 6,977,117 B2 * | 12/2005 | Ariyasu et al. | ............... | 428/477.4 |
| 7,173,080 B2 * | 2/2007 | Yamada et al. | ............... | 524/445 |
| 7,268,190 B2 * | 9/2007 | Ohme et al. | ................... | 525/400 |
| 7,799,412 B2 * | 9/2010 | Yamamura et al. | .......... | 428/212 |
| 7,906,569 B2 * | 3/2011 | Hashiba | ........................ | 524/9 |
| 8,030,382 B2 * | 10/2011 | Endo et al. | ..................... | 524/141 |
| 2001/0007006 A1 * | 7/2001 | Tanimura et al. | ............. | 525/398 |
| 2002/0061583 A1 * | 5/2002 | Kawamura | ................ | C08L 1/08 435/255.1 |
| 2003/0152743 A1 * | 8/2003 | Matsunaga | ............. | D01F 6/625 428/97 |
| 2004/0121175 A1 * | 6/2004 | Flexman et al. | .............. | 428/515 |
| 2006/0286373 A1 * | 12/2006 | Egawa | .................... | B32B 27/08 428/339 |
| 2007/0027247 A1 * | 2/2007 | Ueda et al. | .................... | 524/445 |
| 2007/0082547 A1 * | 4/2007 | Komoto | ............ | B29C 45/14311 439/587 |
| 2007/0089555 A1 * | 4/2007 | Tomoda et al. | .................. | 74/443 |
| 2007/0099016 A1 * | 5/2007 | Nakamura | ............... | B32B 27/36 428/480 |
| 2008/0036118 A1 * | 2/2008 | Prigandt et al. | .............. | 264/483 |
| 2008/0039579 A1 * | 2/2008 | Kimura | .................. | C08G 63/06 524/556 |

FOREIGN PATENT DOCUMENTS

| | | | |
|---|---|---|---|
| JP | 2000-248452 A | * | 9/2000 |
| JP | 2003-001761 A | | 1/2003 |
| JP | 2003-096285 A | * | 4/2003 |
| JP | 2004-232119 A | * | 8/2004 |
| JP | 2006-511649 A | | 4/2006 |
| JP | 2007-160718 | * | 6/2007 |
| JP | 2007-160718 A | | 6/2007 |
| WO | WO 96/13548 A1 | | 5/1996 |
| WO | WO 2006/101063 A1 | | 9/2006 |

OTHER PUBLICATIONS

International Search Report mailed Jun. 23, 2009, in PCT/JP2009/059565, 2 pages.

* cited by examiner

COMPOSITE MOLDED ARTICLE HAVING TWO-LAYER STRUCTURE

CROSS-REFERENCE TO RELATED APPLICATIONS

This application is a National Stage application of PCT/JP2009/059565, filed May 26, 2009, which claims priority from Japanese application JP 2008-140417, filed May 29, 2008.

TECHNICAL FIELD

The present invention relates to a composite molded article having a two-layer structure, which includes a layer comprising a polar thermoplastic resin material and a layer comprising a resin-based material containing an aliphatic ester structure as a main component. A preferable embodiment of the present invention is directed to a composite molded article having the above-mentioned two-layer structure, having a high adhesion strength at the interface, and having splendid mechanical properties.

BACKGROUND ART

In light of the recent global environmental problems, it is a target of attention to use biodegradable (microorganism-degradable or naturally degradable) materials in order to prevent environmental pollution caused by industrial waste. Recently, voluntary restraint of $CO_2$ emissions is strongly demanded in order to deal with the exhaustion of earth resources and the global warming. In such a situation, naturally occurring materials as opposed to petroleum-derived materials, and materials which require a small amount of heat or emit a small amount of $CO_2$ when being incinerated, are paid attention to.

It is conventionally known that polymers having an aliphatic ester structure are biodegradable. Representative examples of such polymers include poly-3-hydroxybutyrate (PHB) produced by microorganisms, polycaprolactone (PCL) which is a synthetic polymer, polybutylene succinate (PBS) or polybutylene succinate adipate (PBSA) each containing succinic acid and butanediol as main components, polyester carbonate (PEC), polylactic acid (PLA) obtained from L-lactic acid and/or D-lactic acid produced by fermentation as a main starting material, and the like. Among these, PLA, for example, is a naturally occurring material.

These polymers having an aliphatic ester structure, except for PLA, generally have properties similar to those of polyethylene and have good moldability and biodegradability. However, such polymers are not sufficiently strong in a field requiring rigidity or a field requiring tensile strength. The rigidity of these polymers may be improved using a filler such as talc or the like or using a nanocomposite forming technology. However, there are problems including reduction of fluidity, and improvement on this point has been desired. Regarding PLA, improvement in thermal resistance and toughness, and also hydrolysis resistance have been strongly desired.

There is no specific limitation on the polar thermoplastic resin. For example, polyacetal is a polymer which is of alphatic ether type or contains alphatic ether as a main component, is mainly derived from methanol that is a petroleum-independent raw material, and is considered to have a low environmental load. Polyacetal is used as an engineering plastic material having splendid mechanical properties, sliding properties, friction and abrasion resistance, chemical resistance and the like. Polyacetal is widely used for core components of automobiles, office automation devices, and the like. Polyacetal exhibits a high crystallinity because of the regular primary structure thereof, and the fields of use thereof have been expanding from the field of injection molding.

When a composite of polyacetal and another resin is formed, the high crystallinity of polyacetal is likely to act as an obstacle against the adhesiveness at the interface. A known successful example is merely formation of a polymer alloy material with polyurethane. In addition, since polyacetal has a functional group substantially only at a polymer terminus, the reactivity of a surface of the molded piece is low and so the adhesion strength of polyacetal with another resin and decorability are inferior. In order to improve the adhesiveness at the interface, it has been attempted to use various compatibility improving agents, perform corona discharge, ion etching, and the like, and even to modify the primary structure of the polymer. However, none of such attempts has sufficiently improved the adhesion strength at the interface despite the complicated operations.

The present inventors have produced a resin composition of a polymer having an aliphatic ester structure and a polymer having an oxymethylene structure, in which the polymers are highly compatible with each other, and also the crystallinity of the polymer having an oxymethylene structure in the resin composition is low. Such a resin composition expresses a sufficient biodegradability and has splendid mechanical properties (Patent Document 1). It has been strongly desired to develop a composite molded article formed of layers containing components having splendid features. There are some disclosures on a laminated film including a biodegradable resin (Patent Documents 2 and 3), but these documents substantially describe a laminated film produced by coextrusion injection of the same type of polyester and do not suggest the improvement in the adhesiveness at the interface.

Patent Document 1: Japanese Laid-Open Patent Publication No. 2000-17153
Patent Document 2: Japanese Laid-Open Patent Publication No. 2005-144726
Patent Document 3: Japanese Laid-Open Patent Publication No. 2005-219487

DISCLOSURE OF THE INVENTION

The present invention, made in light of these problems of the conventional art, has an object of providing a molded article of a composite structure obtained by bonding a polar thermoplastic resin, especially polyacetal, with another resin in a simple manner.

As a result of accumulating active studies, the present inventors found that where a polar thermoplastic resin (A) and a resin (B) containing an aliphatic ester structure as a main component are used in the state where at least a face at which both of the materials contact each other is in a melted state, a high adhesion strength is expressed, and thus completed the present invention.

Namely, the present invention relates to a composite molded article encompassing multiplayer films, multilayer sheets, composite fibers, films, sheets, insert-molded articles and outsert-molded articles such as injection-molded articles, sandwich-molded articles and weld-molded articles as shown below.

The present invention encompasses the following embodiments.

(1) A composite molded article having a two-layer structure obtained by locating a molded article (a) comprising a polar thermoplastic resin (A) inside a mold, plasticizing an aliphatic ester-structured resin (B) at a temperature higher than a melting point of the thermoplastic resin (A), injecting the resin (B) to the inside of the mold, and putting the resin (B) into contact with the molded article (a), wherein the thermoplastic resin (A) is a polyacetal resin;

(2) A composite molded article having a two-layer structure obtained by locating a molded article (b) comprising an aliphatic ester-structured resin (B) inside a mold, plasticizing a polar thermoplastic resin (A) at a temperature higher than a melting point of the resin (B), injecting the thermoplastic resin (A) to the inside of the mold, and putting the thermoplastic resin (A) into contact with the molded article (b), wherein the thermoplastic resin (A) is a polyacetal resin;

(3) The composite molded article according to (1) or (2) above, wherein the molded article (a) is a film, a sheet or a fiber composite;

(4) The composite molded article according to any one of (1) through (3) above, wherein the polar thermoplastic resin (A) contains a part of the aliphatic ester-structured resin (B) beforehand;

(5) The composite molded article according to any one of (1) through (3) above, wherein the aliphatic ester-structured resin (B) contains a part of the polar thermoplastic resin (A) beforehand;

(6) The composite molded article according to any one of (1) through (5) above, wherein the polar thermoplastic resin (A) is polyacetal containing 0.2 to 15 mol (DOL=0.5 to 43 phr) of an oxyalkylene repeat unit having a carbon number of 2 or greater which is represented by the following formula (1) per 100 mol of an oxymethylene repeat unit:

(1)

where $R_0$ and $R_0'$ each represent a hydrogen atom, an alkyl group, an organic group containing an alkyl group, a phenyl group, or an organic group containing a phenyl group; and m represents an integer of 2 to 6;

(7) The composite molded article according to any one of (1) through (6) above, wherein the aliphatic ester-structured resin (B) is at least one selected from polylactic acid (PLA), polyester carbonate (PEC), polybutylene succinate (PBS), polybutylene succinate adipate (PBSA), and copolymers thereof;

(8) A method for producing a composite molded article, comprising the steps of locating a molded article (a) comprising a polar thermoplastic resin (A) inside a mold; and plasticizing an aliphatic ester-structured resin (B) at a temperature higher than a melting point of the thermoplastic resin (A), injecting the resin (B) to the inside of the mold, and putting the resin (B) into contact with the molded article (a) to form a two-layer structure; wherein the thermoplastic resin (A) is a polyacetal resin; and (9) A method for producing a composite molded article, comprising the steps of locating a molded article (b) comprising an aliphatic ester-structured resin (B) inside a mold; and plasticizing a polar thermoplastic resin (A) at a temperature higher than a melting point of the resin (B), injecting the thermoplastic resin (A) to the inside of the mold, and putting the thermoplastic resin (A) into contact with the molded article (b) to form a two-layer structure; wherein the thermoplastic resin (A) is a polyacetal resin.

According to the present invention, a splendid composite molded material which is preferable to modify the contact face between a polar thermoplastic resin and a resin containing an aliphatic ester structure as a main component, and has a high adhesion strength at the interface can be provided.

BEST MODE FOR CARRYING OUT THE INVENTION

Figure 1:
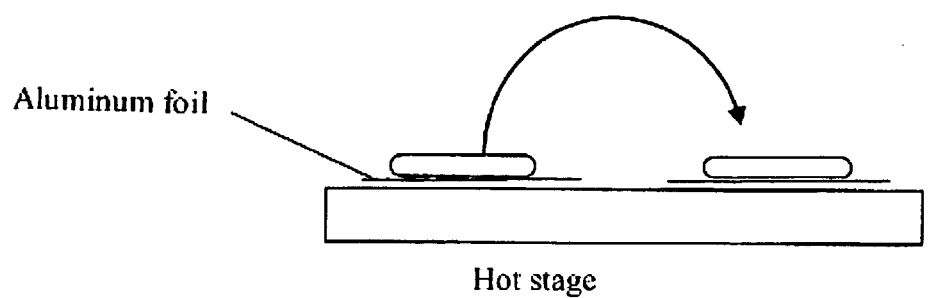
FIG. 1 is a schematic view showing an adhesion test performed in a melted state in Examples 1 through 4 and Comparative examples 1 through 6.

Hereinafter, the present invention will be described in detail.

One embodiment of the present invention is directed to a composite molded article having a two-layer structure obtained by locating a molded article (a) comprising a polar thermoplastic resin (A) inside a mold, plasticizing an aliphatic ester-structured resin (B) at a temperature higher than a melting point of the thermoplastic resin (A), injecting the resin (B) to the inside of the mold, and putting the resin (B) into contact with the molded article (a), wherein the thermoplastic resin (A) is a polyacetal resin.

Another embodiment of the present invention is directed to a composite molded article having a two-layer structure obtained by locating a molded article (b) comprising an aliphatic ester-structured resin (B) inside a mold, plasticizing a polar thermoplastic resin (A) at a temperature higher than a melting point of the resin (B), injecting the thermoplastic resin (A) to the inside of the mold, and putting the thermoplastic resin (A) into contact with the molded article (b), wherein the thermoplastic resin (A) is a polyacetal resin.

The polyacetal resin used in the present invention is a polymer having an acetal structure (—O—CRH—) (where R represents a hydrogen atom or an organic group) in repetition. Usually, an acetal structure in which R is an hydrogen atom, namely, an oxymethylene group (—CH$_2$O—) is used as a main structural unit. The polyacetal resin used in the present invention is not limited to an acetal homopolymer formed only of this repeat structure and may be a copolymer (for example, block copolymer), a terpolymer or the like further containing at least one type of repeat structural unit other than the oxymethylene group; and also may have a branched or crosslinked structure instead of a linear structure.

Examples of the structural unit other than the oxymethylene group include oxyalkylene groups which have a carbon number of 2 to 10 such as an oxyethylene group (—CH$_2$CH$_2$O—), an oxypropylene group (—CH$_2$CH$_2$CH$_2$O—), an oxybutylene group (—CH$_2$CH$_2$CH$_2$CH$_2$O—) and the like. The oxyethylene group is especially preferable. These oxyalkylene groups may have a branched or crosslinked structure having a carbon number of 2 to 6. The content of the oxyalkylene structural unit other than the oxymethylene group is preferably 0.2 to 15 mol % with respect to polyacetal. When the content is less than this range, the thermal stability of polyacetal is reduced. By contrast, when the content is greater than this range, the melting point is lowered and so the splendid mechanical properties, chemical resistance and the like may be spoiled.

The polyacetal resin preferable for the present invention contains 0.2 to 15 mol (DOL=0.5 to 43 phr) of an oxyalkylene repeat unit having a carbon number of 2 or greater which is represented by the following formula (1) per 100 mol of an oxymethylene repeat unit.

where $R_0$ and $R_0'$ each represent a hydrogen atom, an alkyl group, or a phenyl group. m represents an integer of 2 to 6. Examples of the alkyl group include a methyl group, an ethyl group, a propyl group and the like.

For producing a polyacetal resin, any conventionally known method is usable. For example, a polyacetal resin containing an oxymethylene group and an oxyalkylene group having a carbon atom number of 2 to 4 as structural units can be produced by copolymerizing the following: a cyclic oligomer of an oxymethylene group such as, for example, a trimer or a tetramer of formaldehyde (trioxane or tetraoxane), and a cyclic oligomer containing an oxyalkylene group having a carbon atom number of 2 to 4, such as ethylene oxide, 1,3-dioxorane, 1,3,6-trioxocane, 1,3-dioxepane or the like.

The polyacetal resin used for the present invention is preferably a copolymer of a cyclic oligomer such as trioxane, tetraoxane or the like and ethylene oxide or 1,3-dioxorane. Among these, a copolymer of trioxane and 1,3-dioxorane is more preferable. Such a polyacetal resin preferably has a melting viscosity of 0.01 to 150 g/10 minutes as represented by the melting index (MI) based on ASTM-D 1238 (190° C., under a load of 2.16 kg).

Known additives usable with a polyacetal resin include a heat stabilizer and an antioxidant, which are preferably usable in the present invention.

Examples of the heat stabilizer which may be added or incorporated include amine-substituted triazine compounds such as melamine, melamine resin, methylolmelamine, benzoguanamine, cyanoguanidine, N,N-diarylmelamine, CTU guanamine(3,9-bis[2-(3,5-diamino-2,4,6-triazaphenyl) ethyl]-2,4,8,10-tetraoxaspiro[5,5]undecane), CMTU guanamine(3,9-bis[1-(3,5-diamino-2,4,6-triazaphenyl)methyl]-2,4,8,10-tetraoxaspiro[5,5]undecane), and the like; polyamides; urea derivative; hydrazine derivative, urethanes; and the like. Melamine is especially preferable. Usually, the amount of such an additive is 0.01 to 5.0 parts by weight with respect to 100 parts by weight of polyacetal. However, when such an additive is used as a filament material, especially when, among the amine-substituted triazine compounds, a compound bonded with a molecule terminus of formaldehyde or an oxymethylene copolymer to form a crosslinked structure is added, care needs to be taken regarding the amount thereof. The amount of such an additive needs to be of a level at which the heat stability of the oxymethylene resin composition to be obtained can withstand the processing conditions, but also needs to be preferably 0.05 parts by weight or less. When the amount is greater than this, the stretchability is lowered.

Examples of the antioxidant include, for example, sterically hindered phenol. Specific examples of generally and commercially available phenol-based antioxidant include 1,6-hexanediol-bis[3-(3,5-di-t-butyl-4-hydroxyphenyl)propionate], triethyleneglycol-bis-3-(3-t-butyl-4-hydroxy-5-methylphenyl)propionate, pentaerythrityl-tetrakis-3-(3,5-di-t-butyl-4-hydroxyphenyl)propionate, 2,2'-methylenebis(6-t-butyl-4-methylphenol), 3,9-bis{2-[3-(3-t-butyl-4-hydroxy-5-methylphenyl)propionyloxy]-1,1-dimethylethyl}-2,4,8,10-tetraoxaspiro[5,5]undecane, N,N'-hexane-1,6-diylbis[3-(3,5-di-t-butyl-4-hydroxyphenyl)propionamide], 1,6-hexanediylester 3,5-bis(1,1-dimethylethyl)-4-hydroxybenzenepropionate, and the like. Among these, triethyleneglycol-bis-3-(3-t-butyl-4-hydroxy-5-methylphenyl)propionate, pentaerythrityl-tetrakis-3-(3,5-di-t-butyl-4-hydroxyphenyl)propionate, and 1,6-hexanediol-bis[3-(3,5-di-t-butyl-4-hydroxyphenyl)propionate] are preferably usable. The amount thereof is 0.01 to 5 parts by weight, preferably 0.01 to 2.0 parts by weight, and especially preferably 0.02 to 1.0 parts by weight, with respect to 100 parts by weight of oxymethylene copolymer. When the amount of the sterically hindered phenol is insufficient, the decomposition at the time of processing causes reduction of the molecular weight of the resin and also contamination with the decomposed gas to an unignorable level. This causes the problem of reduction of processability. By contrast, when the amount of the sterically hindered phenol is excessive, there occurs too much bleed. This spoils the external appearance of the processed item.

Known additives and/or fillers may further be added in a range in which the original object of the present invention is not spoiled. Usable additives include, for example, crystal nucleators, antioxidants other than the above, plasticizers such as polyalkyleneglycol and the like, matting agents, foaming agents, lubricants, releasing agents, antistatic agents, ultraviolet absorbers, photostabilizers, heat stabilizers, deodorants, flame retarders, sliding agents, perfumes, antibacterial agents, and the like. Usable fillers include, for example, glass fiber, talc, mica, calcium carbonate, potassium titanate, whisker, and the like. In addition, a pigment or a dye may be added to obtain a finish of a desired color tone. Also, any of various monomers, a coupling agent, a terminus processing agent, any of other resins, wood flour, starch or the like may be added to cause denaturing.

Examples of the aliphatic ester-structured resin (B) in the present invention include aliphatic polyesters such as poly-3-hydroxybutyrate (PHB), polycaprolactone (PCL), polybutylene succinate (PBS), polybutylene succinate adipate (PBSA), polylactic acid (PLA) and the like; polyester carbonate (PEC); copolymers thereof; and the like. When necessary, any of various types of additives, for example, antioxidants, hydrolysis inhibitors, photostabilizers, heat stabilizers, weather resistant agents, pigments, and lubricants may be added to the above-listed polymers.

The polar thermoplastic resin (A) and the aliphatic ester-structured resin (B) may be used independently or as a mixture thereof in a uniformly melted state. In order to make good use of the characteristics of the materials of each of the layers included in the two-layer structured composite material, the amount of one of the materials needs to be 50% by volume or less, especially preferably 30% by volume or less.

As described above, the composite molded article according to the present invention has a feature of using a combination of a polar thermoplastic resin (A), especially a polyacetate resin, and an aliphatic ester-structured resin (B). A molded article (a) comprising the polar thermoplastic resin (A) is located inside a mold. The aliphatic ester-structured resin (B) is plasticized at a temperature higher than a melting point of the thermoplastic resin (A) and injected to the inside of the mold. The resin (B) is put into contact with the molded article (a). Thus, the composite molded article having a two-layer structure is produced.

Alternatively, a molded article (b) comprising the aliphatic ester-structured resin (B) is located inside a mold. The polar thermoplastic resin (A) is plasticized at a temperature higher than a melting point of the resin (B) and injected to the inside of the mold. The resin (B) is put into contact with the molded article (a). Thus, the composite molded article having a two-layer structure is produced.

The present invention encompasses, for example, multilayer films, multilayer sheets and composite fibers produced by coextrusion; and laminate films and laminate sheets produced by melt-extruding one material on a sheet or film of the other material. In the present invention, a composite molded article is preferably produced by insert injection molding.

According to insert molding, one material which has already been shaped is fixed inside a mold of an injection molding apparatus, and the other material which is different from the one material is injection-molded to bury the one material in the other material. Insert molding is commonly used especially as a method which makes good use of a metal material or an inorganic solid material. Outsert molding is similar to insert molding, and is also used in order to integrate two different materials.

Sandwich molding is usually performed as follows. Two apparatuses each including a heating device for plasticizing materials are prepared. The two apparatuses have a common cavity and a common gate. A material used for forming a skin layer is injected in a predetermined amount, and then a material used for forming a core layer is injected from the same gate. Owing to this, the first-injected material forms a skin, and the second-injected material forms a core. Thus, a composite molded article in which a surface of the core is covered with a different material is formed. In the case where the apparatuses have a common cavity but different gates, a face (weld) at which the two materials contact each other is present in the cavity. By contrast, according to sandwich molding, the entirety of the core layer is basically in contact with, and covered with, the skin layer.

When a composite article is formed of the polar thermoplastic resin (A) and the aliphatic ester-structured resin (B), a part of a face at which the two components at least contact each other needs to be put into a melted state. When the components are mixed together in the vicinity of the interface by setting appropriate injection conditions (temperature of the resin to be injected, injection rate, holding pressure, holding time, temperature of the mold), and thus an eutectic is formed to express a high interface strength.

For example, in the case of insert molding, when the temperature of the resin to be injected is too low, the surface of a molded article inserted into the mold beforehand is not sufficiently melted, and so a high interface strength cannot be obtained. In the present invention, it is preferable that the temperature of the resin to be injected is higher than the melting point of the molded article inserted into the mold beforehand. However, when the temperature is too high, the shape of the article is destroyed or the mechanical properties thereof are deteriorated. Therefore, the upper limit of the temperature should be higher by about 100° C. than the melting point. When the crystallization degree of the inserted molded article is too high, the article needs a large amount of heat to be melted. Therefore, the temperature of the resin to be injected needs to be set to be still higher. The injection rate, the holding pressure and the holding time are considered to be relevant to mutual invasion through the interface. Especially, the holding pressure and the holding time are preferably set to be as high as possible in a range in which neither the molding efficiency nor the external appearance of the molded article is influenced.

Hereinafter, the present invention will be specifically described by way of examples. The present invention is not limited to any of the following examples.

Examples 1 Through 4, Comparative Examples 1 Through 6

Adhesion Test in a Melted State

The resin materials shown in Table 1 were each put into a melted state on a hot plate heated to 190° C. in the manner shown in FIG. 1. While the resin materials were kept in the melted state, one of the two resin materials was stacked on the other resin material while being turned upside down. The resin materials were thermally pressed (for 10 seconds under a load of 5 kg), and then left to be cooled down. The adhesion state between the two components was observed, and the adhesion strength was graded.

It was confirmed that the combination of the polyacetal resin, which is the thermoplastic resin (A), and the aliphatic polyester-structured resin (B) exhibits a high adhesion strength when contacting each other in a melted state.

TABLE 1

Adhesion test in a melted state

| | Ex. 1 | Ex. 2 | Ex. 3 | Ex. 4 | Comparative ex. 1 | Comparative ex. 2 | Comparative ex. 3 | Comparative ex. 4 | Comparative ex. 5 | Comparative ex. 6 |
|---|---|---|---|---|---|---|---|---|---|---|
| Melted resin (A) | POM | POM | POM | POM | POM | POM | POM | POM | PP | PE |
| Melted resin (B) | PLA | PBS | PBSA | PEC | PET | PBT | PE | PP | PLA | PLA |
| Adhesion state | ○ | ○ | ○ | ○ | X | X | X | X | Δ | X |

○: Good; Not peeled off even when the film was pulled out.
Δ: Peeled when the film was pulled out.
X: Not adhered.
* P40B (thermoplastic polyester elastomer produced by Toyobo Co., Ltd.; Pelprene)
* polyethylene terephthalate (PET) and polybutylene terephthalate (PBT) were melted at 300° C.

melted state is not sufficient, a sufficient adhesion strength is not obtained. For example, where polyacetal and a resin having an aliphatic ester structure are combined, when the melted state is sufficient, it is considered that the two POM (polyacetal; melting point: 155° C.): Iupital V20-HE produced by Mitsubishi Engineering-Plastics Corporation PLA (polylactic acid; melting point: 170° C.): Terramac TE-2000 produced by Unitika Ltd. PBS (polybutylene succinate; melting point: 114° C.): Bionolle #1001 produced by Showa Kobunshi Kabushiki Kaisha
PBSA (polybutylene succinate adipate; melting point: 95° C.): Bionolle #3001 produced by Showa Kobunshi Kabushiki Kaisha
PEC (polyester carbonate: melting point: 106° C.): Iupec PEC350 produced by Mitsubishi Gas Chemical Company Inc.
P40B (thermoplastic polyester elastomer, melting point: 180° C.): Pelprene produced by Toyobo Co., Ltd.
PET (polyethylene terephthalate; melting point: 270° C.): Bellpet IP123A produced by Kanebo Gosen Kabushiki Kaisha
PBT (polybutylene terephthalate; melting point: 225° C.): Novaduran 5010R5 produced by Mitsubishi Engineering-Plastics Corporation
PE (polyethylene; melting point: 100° C.): Hi-Zex 1700J produced by Prime Polymer Co., Ltd.
PP (polypropylene: melting point: 160° C.): Prime Polypro F113G produced by Prime Polymer Co., Ltd.

Examples 5 Through 13, Comparative Examples 7 Through 13

Adhesion Test of the Film and the Melted Resin

Next, a simplified adhesion test was performed on the combinations of films and melted resins shown in Table 2.

Figure 2:
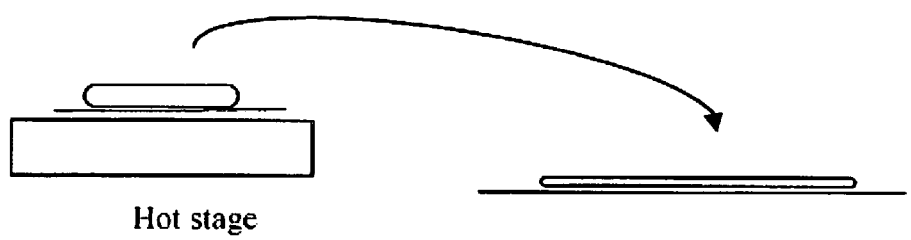
FIG. 2 is a schematic view showing an adhesion test between a film and a melted resin performed in Examples 5 through 13 and Comparative examples 7 through 13.

Each film was prepared by thermally pressing an unrolled film or a pellet using a monoaxial extruder having a diameter of $\phi$25 mm and a T-die having a width of 200 mm (hanger type). The film and the melted resin were put into contact with each other and pressed in the manner shown in FIG. 2. Namely, the film and the resin put into a melted state were placed separately, and one of the two components was stacked on the other component while being turned upside down. The film and the melted resin were thermally pressed (for 10 seconds under a load of 5 kg). The adhesion state onto the film was observed, and the adhesion strength was graded.

Since the temperature of the melted resin was set to be higher than the melting point of the film, the surface of the film was partially melted when contacting the melted resin, and so a high adhesion strength was exhibited. When a polyacetal film having a high crystallization degree was used, the temperature of the melted resin needed to be set to be still higher. As shown in Example 7, the adhesiveness was improved when PLA of an amount which does not spoil the features of polyacetal was added to the film component to decrease the crystallization degree.

TABLE 2

Adhesion test on the film and melted resin combinations

|  | Ex. 5 | Ex. 6 | Ex. 7 | Comparative ex. 7 | Comparative ex. 8 | Comparative ex. 9 |
|---|---|---|---|---|---|---|
| Film (A) | POM | POM | POM/PLA 80/20 wt % | POM | POM | POM |
| Melting point | 155 | 155 | 154 | 155 | 155 | 155 |
| Melted resin (B) | PLA | PLA | PLA | PET | PE | PP |
| Temperature of melted resin | 210 | 200 | 200 | 190 | 190 | 190 |
| Adhesion state | ○ | Δ | ○ | X | X | X |

|  | Ex. 8 | Ex. 9 | Ex. 10 | Comparative ex. 10 | Ex. 11 | Ex. 12 | Ex. 13 | Comparative ex. 11 | Comparative ex. 12 | Comparative ex. 13 |
|---|---|---|---|---|---|---|---|---|---|---|
| Film (B) | PLA | PLA | PLA | PLA | PBS | PBSA | PEC | PET | PE | PP |
| Melting point | 170 | 170 | 170 | 170 | 114 | 95 | 106 | 270 | 100 | 160 |
| Melted resin (A) | POM | POM/PLA 80/20 wt % | POM | POM | POM | POM | POM | POM | POM | POM |
| Temperature of melted resin | 190 | 190 | 180 | 170 | 190 | 190 | 190 | 190 | 190 | 190 |
| Adhesion state | ○ | ○ | Δ | X | ○ | ○ | ○ | X | X | X |

○: Good; Not peeled off even when the film was pulled out.
Δ: Peeled when the film was pulled out.
X: Not adhered.

Examples 14 Through 28

Film Insert Molding

Film insert molding was performed with the combinations and the injection conditions shown in Table 3. The adhesion state of the film was measured by a 90° peel test on the film.

TABLE 3

Film insert molding

|  |  | Ex. 14 | Ex. 15 | Ex. 16 | Ex. 17 | Ex. 18 |
|---|---|---|---|---|---|---|
| Film (A) |  | POM | POM | POM | POM | POM |
| Melting point | ° C. | 155 | 155 | 155 | 155 | 155 |
| Substrate (B) |  | PLA | PLA | PLA | PLA | PLA |

TABLE 3-continued

| Film insert molding | | | | | | |
|---|---|---|---|---|---|---|
| Molding conditions | | | | | | |
| Injection rate | mm/sec | 300 | 300 | 300 | 300 | 500 |
| Temperature of resin to be injected | ° C. | 200 | 210 | 220 | 230 | 230 |
| ΔT | ° C. | 45 | 55 | 65 | 75 | 75 |
| Holding pressure | MPa | 5 | 5 | 5 | 5 | 5 |
| Holding time | sec | 20 | 20 | 20 | 20 | 20 |
| Temperature of mold | ° C. | 30 | 30 | 30 | 30 | 30 |
| Adhesion strength | N/mm | 0.04 | 0.05 | 0.12 | 0.12 | 0.13 |
| | | Ex. 19 | Ex. 20 | Ex. 21 | Ex. 22 | Ex. 23 |
| Film (A) | | POM | POM | POM | POM | POM |
| Melting point | ° C. | 165 | 165 | 165 | 165 | 165 |
| Substrate (B) | | PLA | PLA | PLA | PLA | PLA |
| Molding conditions | | | | | | |
| Injection rate | mm/sec | 300 | 300 | 300 | 300 | 500 |
| Temperature of resin to be injected | ° C. | 200 | 210 | 220 | 230 | 230 |
| ΔT | ° C. | 35 | 45 | 55 | 65 | 65 |
| Holding pressure | MPa | 5 | 5 | 5 | 5 | 5 |
| Holding time | sec | 20 | 20 | 20 | 20 | 20 |
| Temperature of mold | ° C. | 30 | 30 | 30 | 30 | 30 |
| Adhesion strength | N/mm | 0.02 | 0.03 | 0.04 | 0.07 | 0.08 |
| | | Ex. 24 | Ex. 25 | Ex. 26 | Ex. 27 | Ex. 28 |
| Film (B) | | PLA | PLA | PLA | PLA | PLA |
| Melting point | ° C. | 170 | 170 | 170 | 170 | 170 |
| Substrate (A) | | POM | POM | POM | POM | POM |
| Molding conditions | | | | | | |
| Injection rate | mm/sec | 300 | 100 | 300 | 100 | 300 |
| Temperature of resin to be injected | ° C. | 175 | 180 | 180 | 190 | 190 |
| ΔT | ° C. | 5 | 10 | 10 | 20 | 20 |
| Holding pressure | MPa | 5 | 5 | 5 | 5 | 5 |
| Holding time | sec | 20 | 20 | 20 | 20 | 20 |
| Temperature of mold | ° C. | 30 | 30 | 30 | 30 | 30 |
| Adhesion strength | N/mm | Broken on the film side due to excessive adhesion strength | | | | |

Example 29, Comparative Examples 14 Through 17

Weld Molding

Weld molding was performed with the combinations shown in Table 4 to produce dumbbell-shaped samples. A tensile test was performed, and the broken parts were observed.

TABLE 4

| Tensile test on the weld-molded samples | | | | | |
|---|---|---|---|---|---|
| | Ex. 29 | Comparative ex. 14 | Comparative ex. 15 | Comparative ex. 16 | Comparative ex. 17 |
| (A) | POM | POM | PLA | POM | — |
| (B) | PLA | POM | PLA | — | PLA |
| Tensile strength [MPa] | 51 | 51 | 71 | 50 | 67 |
| Elongation at break [%] | 68 | 13 | 3 | 26 | 4 |
| Necking | Occur | Not occur | Not occur | Not occur | Not occur |

In Example 29, neither the weld strength nor the elongation was decreased. Especially, the elongation was kept high owing to necking, and the weld interface was not broken.

Examples 30 Through 32

Sandwich Molding

Sandwich molding was performed with the combinations shown in Table 5 to produce dumbbell-shaped samples. A bending test was performed. The bending elasticity and strength relied on the occupying ratio of each component with respect to the cross-section of the test sample. No layer of component was observed as being peeled off at the interface due to the bending stress.

TABLE 5

| Bending test results on the sandwich-molded samples | | | | | | |
|---|---|---|---|---|---|---|
|  | Ex. 30 | Ex. 31 | Ex. 32 | Reference 1 | Reference 2 | Reference 3 |
| Skin | POM | PLA | POM/PLA 80/20 wt % | POM | PLA | POM/PLA 80/20 wt % |
| Core | PLA | POM | PLA | POM | PLA | POM/PLA 80/20 wt % |
| Bending elasticity [GPa] | 2.2 (2.3) | 2.7 (2.4) | 2.6 (2.9) | 1.4 | 3.3 | 2.5 |
| Bending strength [MPa] | 78 (73) | 77 (73) | 86 (83) | 54 | 93 | 73 |
| Peel-off at interface at bending stress | Not occur | Not occur | Not occur | Not occur | Not occur | Not occur |

Numeral in ( ): Value obtained by calculation as an arithmetic average from the skin/core area size of the cross-section, using data on a single component

The invention claimed is:

1. A composite molded article having a two-layer structure obtained by locating a molded article (a) comprising a polar thermoplastic resin (A) inside a mold, plasticizing an aliphatic ester-structured resin (B) at a temperature higher than a melting point of the thermoplastic resin (A) by 35 to 75° C., injecting the resin (B) to the inside of the mold, and putting the resin (B) into contact with the molded article (a),
wherein the polar thermoplastic resin (A) is a polyacetal resin,
wherein the aliphatic ester-structured resin (B) is at least one selected from polylactic acid (PLA), polyester carbonate (PEC), polybutylene succinate (PBS), and polybutylene succinate adipate (PBSA),
wherein said polylactic acid (PLA) has a melting temperature of about 170° C., said polyester carbonate (PEC) has a melting temperature of about 106° C., said polybutylene succinate (PBS) has a melting temperature of about 114° C., and said polybutylene succinate adipate (PBSA) has a melting temperature of about 95° C.;
wherein the polar thermoplastic resin (A) contains 50% by volume or less of the aliphatic ester-structured resin (B) beforehand, or the aliphatic ester-structured resin (B) contains 50% by volume or less of the polar thermoplastic resin (A) beforehand,
wherein the beforehand amount of the aliphatic ester-structured resin (B) in the polar thermoplastic resin (A) or the beforehand amount of the polar thermoplastic resin (A) in the aliphatic ester-structured resin (B) is such that the aliphatic ester-structured resin (B) adheres to the molded article (a), and
wherein the polar thermoplastic resin (A) is polyacetal containing 0.2 to 15 mol (DOL=0.5 to 43 phr) of an oxyalkylene repeat unit having a carbon number of 2 or greater which is represented by the following formula (1) per 100 mol of an oxymethylene repeat unit:

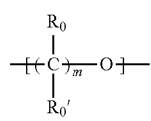

(1)

where $R_0$ and $R_0'$ each represent a hydrogen atom, an alkyl group, an organic group containing an alkyl group, a phenyl group, or an organic group containing a phenyl group; and m represents an integer of 2 to 6.

2. The composite molded article according to claim 1, wherein the molded article (a) is a film, a sheet or a fiber composite.

3. The composite molded article according to claim 1, wherein the polar thermoplastic resin (A) contains a part of the aliphatic ester-structured resin (B) beforehand.

4. The composite molded article according to claim 1, wherein the aliphatic ester-structured resin (B) contains a part of the polar thermoplastic resin (A) beforehand.

5. A composite molded article having a two-layer structure obtained by locating a molded article (b) comprising an aliphatic ester-structured resin (B) inside a mold, plasticizing a polar thermoplastic resin (A) at a temperature higher than a melting point of the resin (B) by 5 to 95° C., injecting the thermoplastic resin (A) to the inside of the mold, and putting the thermoplastic resin (A) into contact with the molded article (b),
wherein the polar thermoplastic resin (A) is a polyacetal resin,
wherein the aliphatic ester-structured resin (B) is at least one selected from polylactic acid (PLA), polyester carbonate (PEC), polybutylene succinate (PBS), and polybutylene succinate adipate (PBSA),
wherein said polylactic acid (PLA) has a melting temperature of about 170° C., said polyester carbonate (PEC) has a melting temperature of about 106° C., said polybutylene succinate (PBS) has a melting temperature of about 114° C., and said polybutylene succinate adipate (PBSA) has a melting temperature of about 95° C.;
wherein the polar thermoplastic resin (A) contains 50% by volume or less of the aliphatic ester-structured resin (B) beforehand, or the aliphatic ester-structured resin (B) contains 50% by volume or less of the polar thermoplastic resin (A) beforehand,
wherein the beforehand amount of the aliphatic ester-structured resin (B) in the polar thermoplastic resin (A) or the beforehand amount of the polar thermoplastic resin (A) in the aliphatic ester-structured resin (B) is such that the polar thermoplastic resin (A) adheres to the molded article (b), and
wherein the polar thermoplastic resin (A) is polyacetal containing 0.2 to 15 mol (DOL=0.5 to 43 phr) of an oxyalkylene repeat unit having a carbon number of 2 or greater which is represented by the following formula (1) per 100 mol of an oxymethylene repeat unit:

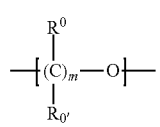

(1)

where $R_0$ and $R_0'$ each represent a hydrogen atom, an alkyl group, an organic group containing an alkyl group, a phenyl group, or an organic group containing a phenyl group; and m represents an integer of 2 to 6.

6. The composite molded article according to claim 5, wherein the molded article (b) is a film, a sheet or a fiber composite.

7. The composite molded article according to claim 5, wherein the polar thermoplastic resin (A) contains a part of the aliphatic ester-structured resin (B) beforehand.

8. The composite molded article according to claim 5, wherein the aliphatic ester-structured resin (B) contains a part of the polar thermoplastic resin (A) beforehand.

9. A method for producing a composite molded article, comprising the steps of:
locating a molded article (a) comprising a polar thermoplastic resin (A) inside a mold; and
plasticizing an aliphatic ester-structured resin (B) at a temperature higher than a melting point of the thermoplastic resin (A) by 35 to 75° C., injecting the resin (B) to the inside of the mold, and putting the resin (B) into contact with the molded article (a) to form a two-layer structure;
wherein the polar thermoplastic resin (A) is a polyacetal resin,
wherein the aliphatic ester-structured resin (B) is at least one selected from polylactic acid (PLA), polyester carbonate (PEC), polybutylene succinate (PBS), and polybutylene succinate adipate (PBSA),
wherein said polylactic acid (PLA) has a melting temperature of about 170° C., said polyester carbonate (PEC) has a melting temperature of about 106° C., said polybutylene succinate (PBS) has a melting temperature of about 114° C., and said polybutylene succinate adipate (PBSA) has a melting temperature of about 95° C.;
wherein the polar thermoplastic resin (A) contains 50% by volume or less of the aliphatic ester-structured resin (B) beforehand, or the aliphatic ester-structured resin (B) contains 50% by volume or less of the polar thermoplastic resin (A) beforehand,
wherein the beforehand amount of the aliphatic ester-structured resin (B) in the polar thermoplastic resin (A) or the beforehand amount of the polar thermoplastic resin (A) in the aliphatic ester-structured resin (B) is such that the aliphatic ester-structured resin (B) adheres to the molded article (a), and
wherein the polar thermoplastic resin (A) is polyacetal containing 0.2 to 15 mol (DOL=0.5 to 43 phr) of an oxyalkylene repeat unit having a carbon number of 2 or greater which is represented by the following formula (1) per 100 mol of an oxymethylene repeat unit:

(1)

where $R_0$ and $R_0'$ each represent a hydrogen atom, an alkyl group, an organic group containing an alkyl group, a phenyl group, or an organic group containing a phenyl group; and m represents an integer of 2 to 6.

10. The method of claim 8, wherein method for producing a composite molded article consists essentially of the steps of:
locating a molded article (a) comprising a polar thermoplastic resin (A) inside a mold; and
plasticizing an aliphatic ester-structured resin (B) at a temperature higher than a melting point of the thermoplastic resin (A) by 35 to 75° C., injecting the resin (B) to the inside of the mold, and putting the resin (B) into contact with the molded article (a) to form a two-layer structure.

11. A method for producing a composite molded article, comprising the steps of:
locating a molded article (b) comprising an aliphatic ester-structured resin (B) inside a mold; and
plasticizing a polar thermoplastic resin (A) at a temperature higher than a melting point of the resin (B) by 5 to 95° C., injecting the thermoplastic resin (A) to the inside of the mold, and putting the thermoplastic resin (A) into contact with the molded article (b) to form a two-layer structure;
wherein the polar thermoplastic resin (A) is a polyacetal resin,
wherein the aliphatic ester-structured resin (B) is at least one selected from polylactic acid (PLA), polyester carbonate (PEC), polybutylene succinate (PBS), and polybutylene succinate adipate (PBSA),
wherein said polylactic acid (PLA) has a melting temperature of about 170° C., said polyester carbonate (PEC) has a melting temperature of about 106° C., said polybutylene succinate (PBS) has a melting temperature of about 114° C., and said polybutylene succinate adipate (PBSA) has a melting temperature of about 95° C.;
wherein the polar thermoplastic resin (A) contains 50% by volume or less of the aliphatic ester-structured resin (B) beforehand or wherein the aliphatic ester-structured resin (B) contains 50% by volume or less of the polar thermoplastic resin (A) beforehand,
wherein the beforehand amount of the aliphatic ester-structured resin (B) in the polar thermoplastic resin (A) or the beforehand amount of the polar thermoplastic resin (A) in the aliphatic ester-structured resin (B) is such that the polar thermoplastic resin (A) adheres to the molded article (b), and
wherein the polar thermoplastic resin (A) is polyacetal containing 0.2 to 15 mol (DOL=0.5 to 43 phr) of an oxyalkylene repeat unit having a carbon number of 2 or greater which is represented by the following formula (1) per 100 mol of an oxymethylene repeat unit:

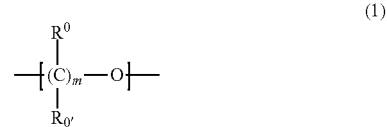

(1)

where $R_0$ and $R_0'$ each represent a hydrogen atom, an alkyl group, an organic group containing an alkyl group, a phenyl group, or an organic group containing a phenyl group; and m represents an integer of 2 to 6.

12. The method of claim 11, wherein method for producing a composite molded article consists essentially of the steps of:

locating a molded article (b) comprising an aliphatic ester-structured resin (B) inside a mold; and plasticizing a polar thermoplastic resin (A) at a temperature higher than a melting point of the resin (B) by 5 to 95° C., injecting the thermoplastic resin (A) to the inside of the mold, and putting the thermoplastic resin (A) into contact with the molded article (b) to form a two-layer structure.

\* \* \* \* \*